(12) United States Patent
Provo

(10) Patent No.: US 7,787,864 B2
(45) Date of Patent: Aug. 31, 2010

(54) WIRELESS EMAIL COMMUNICATIONS SYSTEM PROVIDING DEVICE CAPABILITY SET UPDATE FEATURES AND RELATED METHODS

(75) Inventor: Nathan Provo, Ravensdale, WA (US)

(73) Assignee: Teamon Systems, Inc., Issaquah, WA (US)

( * ) Notice: Subject to any disclaimer, the term of this patent is extended or adjusted under 35 U.S.C. 154(b) by 385 days.

(21) Appl. No.: 11/389,906

(22) Filed: Mar. 27, 2006

(65) Prior Publication Data

US 2007/0226303 A1 Sep. 27, 2007

(51) Int. Cl.
- H04M 1/66 (2006.01)
- H04M 11/00 (2006.01)
- H04B 1/38 (2006.01)
- G06F 15/16 (2006.01)

(52) U.S. Cl. .................. 455/411; 455/410; 455/403; 455/558; 709/206; 709/203; 709/219

(58) Field of Classification Search .......... 709/206; 455/403, 557, 565–566

See application file for complete search history.

(56) References Cited

U.S. PATENT DOCUMENTS

| | | | |
|---|---|---|---|
| 6,449,479 B1 | 9/2002 | Sanchez | 455/433 |
| 2002/0120860 A1* | 8/2002 | Ferguson | 726/5 |
| 2003/0060234 A1 | 3/2003 | Beyda | 455/560 |
| 2003/0153302 A1* | 8/2003 | Lewis et al. | 455/412 |
| 2004/0187012 A1* | 9/2004 | Kohiyama et al. | 713/193 |
| 2006/0030368 A1 | 2/2006 | Soelberg | 455/566 |
| 2006/0111080 A1* | 5/2006 | Bajar et al. | 455/411 |

(Continued)

FOREIGN PATENT DOCUMENTS

WO WO 03010937 A2 * 2/2003

(Continued)

OTHER PUBLICATIONS

"Push Extensions to the IMAP Protocol (P-IMAP)", Maes et al., IETF Standard-working-draft, Internet Engineering Task Force, IETF, CH, No. 6, Feb. 2005, XP015039363, ISSN: 0000-0004, pp. 1-52.

Primary Examiner—Nick Corsaro
Assistant Examiner—Tangela T. Chambers
(74) Attorney, Agent, or Firm—Allen, Dyer, Doppelt, Milbrath & Gilchrist, P.A.

(57) ABSTRACT

A wireless communications system may include a plurality of mobile wireless communications devices each having a subscriber account associated therewith including a respective personal identification number (PIN) and a device identification (ID). Each device ID may have associated therewith a device capability set from among a plurality of device capability sets. The system may further include at least one electronic mail (email) server including a database of subscriber accounts and for sending emails to and receiving emails from the mobile wireless communications devices based upon the PINs and device IDs. The at least one email server may compare a given PIN and device ID, based upon a communication from a given mobile wireless device, with a corresponding PIN and device ID for the corresponding subscriber account in the database, and update a corresponding device capability set for the corresponding subscriber account based upon a discrepancy.

20 Claims, 12 Drawing Sheets

U.S. PATENT DOCUMENTS

| | | |
|---|---|---|
| 2006/0111081 A1* | 5/2006 | Whittington et al. ......... 455/411 |
| 2006/0143264 A1* | 6/2006 | Payne et al. .................. 709/203 |
| 2006/0217113 A1* | 9/2006 | Rao et al. ................. 455/422.1 |
| 2007/0010242 A1* | 1/2007 | Blants et al. ................. 455/411 |
| 2007/0016676 A1* | 1/2007 | Breuer et al. ............... 709/225 |
| 2007/0099599 A1* | 5/2007 | Smith et al. .............. 455/414.1 |

FOREIGN PATENT DOCUMENTS

| | | |
|---|---|---|
| WO | WO 03019445 A1 * | 3/2003 |
| WO | WO2005015935 | 2/2005 |

\* cited by examiner

| SubID MSISDN | DevicePin | ExternalID CustID | MboxAcctID | View Integrations | Hosted Mailbox | Plan | Database |
|---|---|---|---|---|---|---|---|
| PRV5681! | 200FBEDB | PRV5681!:[Carrier] | 265285 | | | [Plan] | bis006 |

FIG. 20

| SubID MSISDN | Device Pin | ExternalID CustID | MboxAcct ID | View Integrations | Hosted Mailbox | Plan | Database |
|---|---|---|---|---|---|---|---|
| 4152179837 | | 42102421:[Carrier] | 288809 | | | [Plan] | bis001 |

FIG. 21

WIRELESS EMAIL COMMUNICATIONS SYSTEM PROVIDING DEVICE CAPABILITY SET UPDATE FEATURES AND RELATED METHODS

FIELD OF THE INVENTION

The present invention relates to the field of communications systems, and, more particularly, to wireless electronic mail (email) communications systems and related methods.

BACKGROUND OF THE INVENTION

Electronic mail (email) has become an integral part of business and personal communications. As such, many users have multiple email accounts for work and home use. Moreover, with the increased availability of mobile cellular and wireless local area network (LAN) devices that can send and receive emails, many users wirelessly access emails stored in source mailboxes of different email storage servers (e.g., corporate email storage server, Yahoo® email service, Hotmail™ email service, AOL® email service, etc.).

Yet, email distribution and synchronization across multiple mailboxes and over wireless networks can be quite challenging, particularly when this is done on a large scale for numerous users. For example, different email accounts may be configured differently and with non-uniform access criteria. That is, different user devices will have different capabilities such as the ability to display images, receive file attachments, etc. Moreover, different devices may access the email system through different interfaces (e.g., HTML, WML, etc.). Further, individual user accounts may have different services or features enabled. Accordingly, it may become difficult to maintain service account information when certain events occur, such as a user switching to a different mobile wireless communications device or when a service provider updates service platforms.

Various attempts have been made in the prior art to modify mobile telephone subscriber services. Once such example is disclosed in U.S. Pat. No. 6,449,479 to Sanchez. This patent is directed to an apparatus for changing a mobile subscriber's feature profile in a telecommunications network. The apparatus includes a Home Location Register (HLR) with a memory for storing the feature profile, which includes one or more service features, such as call waiting, call blocking, etc. The apparatus also includes a node that communicates electronically with the HLR. The node recognizes a subscriber feature profile change request, validates the request, determines whether the subscriber is currently using the mobile phone to which the profile is assigned, and prevents changes in the profile except for changes specifically requested by the subscriber if the subscriber is not using the mobile phone to which the profile is assigned.

While such systems may be helpful for allowing users to update basic phone service features, a user typically does not have the knowledge or the access required to make changes to information such as device/subscriber identifications (IDs), personal identification numbers (PINs), and device capability settings in wireless email service accounts. As a result, the user typically has to contact a wireless network provider's customer service when switching devices or when system upgrades are made that effect the user's ability to send and receive emails. Not only is this an inconvenience for users, but the increased man hours needed staff a service center to handle large call volumes can be expensive for the network provider as well.

BRIEF DESCRIPTION OF THE DRAWINGS

FIG. 20 and FIG. 21 are tabular views of user accounts illustrating various unreconciled information therein.

DETAILED DESCRIPTION OF THE PREFERRED EMBODIMENTS

Figure 1:
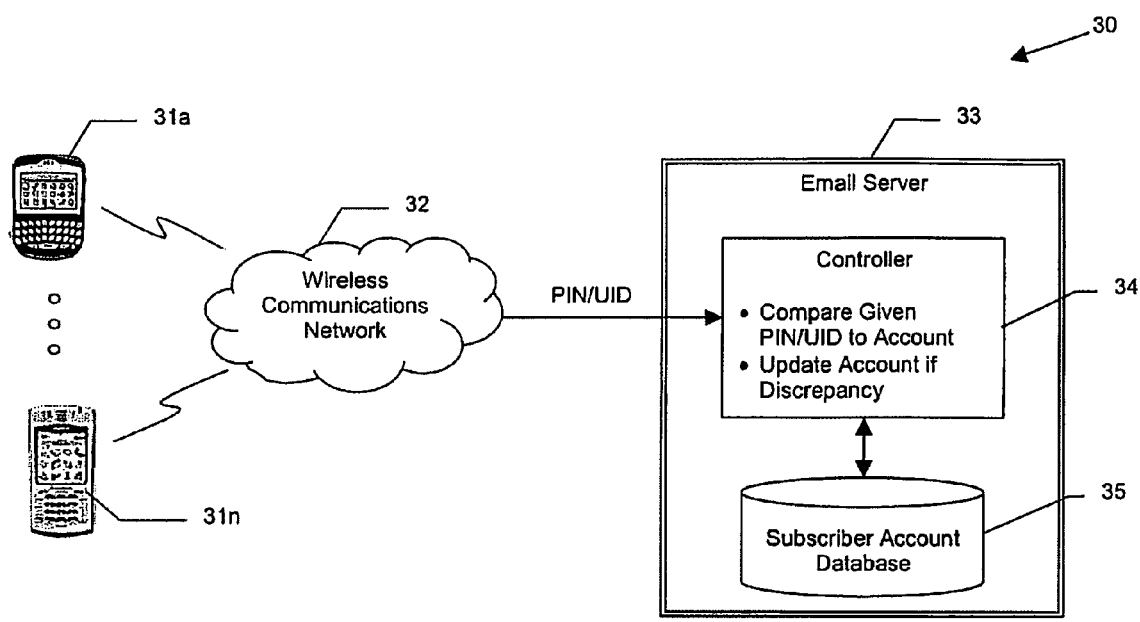
FIG. 1 is schematic block diagram of a wireless communications system in accordance with the present invention.

The present description is made with reference to the accompanying drawings, in which preferred embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime and multiple prime notation are used to indicate similar elements in alternative embodiments.

Generally speaking, a wireless communications system is disclosed herein which may include a plurality of mobile wireless communications devices each having a subscriber account associated therewith including a respective personal identification number (PIN) and a device identification (ID). Furthermore, each device ID may have associated therewith a device capability set from among a plurality of device capability sets, where the device capability sets may include features supported by particular devices, for example. The system may further include at least one electronic mail (email) server including a database of subscriber accounts and for sending emails to and receiving emails from the mobile wireless communications devices based upon the PINs and device IDs. The at least one email server may compare a given PIN and device ID, based upon a communication from a given mobile wireless device, with a corresponding PIN and device ID for the corresponding subscriber account in the database, and update a corresponding device capability set for the corresponding subscriber account based upon a discrepancy.

More particularly, the device capability sets may include at least one of an image display capability, a file attachment handling capability, and a communications interface capability. The discrepancy may be a difference between the device ID associated with the communication from the given mobile wireless device and the device ID in the corresponding subscriber account. Also, the at least one email server may prompt the given mobile wireless communications device to provide the communication.

By way of example, the device IDs may be International Mobile Station Equipment Identities (IMEIs). Additionally, the at least one email server may interface with the given wireless communications device via a Hypertext Markup Language (HTML) interface and/or a Wireless Markup Language (WML) interface.

The wireless communications system may further include at least one wireless communications network for establishing wireless communications links with the mobile wireless communications devices. Moreover, the at least one email server may send emails to and receive emails from the mobile wireless communications devices via the at least one wireless communications network.

A wireless communications method aspect may include establishing respective subscriber accounts for a plurality of mobile wireless communications devices. Each subscriber account may include a respective personal identification number (PIN) and a device identification (ID), and each device ID may have associated therewith a device capability set from among a plurality of device capability sets. The method may further include sending emails to and receiving emails from the mobile wireless communications devices based upon the PINs and device IDs. The method may also include comparing a given PIN and device ID, based upon a communication from a given mobile wireless device, with a corresponding PIN and device ID for the corresponding subscriber account, and updating a corresponding device capability set for the corresponding subscriber account based upon a discrepancy.

Referring initially to FIG. 1, a wireless communications system 30 illustratively includes a plurality of mobile wireless communications devices 31a-31n each having a subscriber account associated therewith. More particularly, the subscriber accounts include a respective personal identification number (PIN) and a unique identification (UID). In the case of a Global System for Mobile communication (GSM) based system, the unique identifiers may be International Mobile Subscriber Identities (IMSIs) and/or International Mobile Station Equipment Identities (IMEIs), for example, as will be appreciated by those skilled in the art. Of course, other unique identifiers may also be included in different systems and/or implementations. The service accounts may also have associated therewith user integrations or settings (email filters, archiving/deleting parameters, etc.), as well as the capabilities of the particular device associated with the account, as will be discussed further below.

The system 30 further illustratively includes a wireless communications network 32 for establishing wireless communications links with the mobile wireless communications devices. By way of example, the wireless communications network 32 may be a cellular communications network and/or a local/wide area network.

One or more email servers 33 are used for sending emails to and receiving emails from the mobile wireless communications devices 31a-31n. More particularly, the email server 33 may aggregate emails from one or more user email accounts (e.g., Gmail™ email service, Hotmail™ email service, AOL® email service, etc.) and send the email messages to the user, as well as distribute emails generated on the mobile wireless communications devices 31a-31n to designated addressees via the World Wide Web, as will be appreciated by those skilled in the art.

The email server 33 illustratively includes a controller 34 and a subscriber account database 35. It should be noted that while these components are shown as being in a same email server, it will be appreciated that the control and database functions may in fact be distributed across multiple servers or computing devices in some embodiments, particularly in large scale network implementations.

The subscriber account database 35 is where subscriber account information is stored. By way of example, each account may include the PINs, IMSIs, and IMEIs associated with the given subscriber/device, as well as a Subscriber Identity Module (SIM) identifier associated with the given device, the particular wireless network (i.e., carrier) and services a subscriber uses, user settings (e.g., filters, notification preferences, etc.), and account status information (e.g., active, suspended, etc.).

Knowing the given device, carrier, and services a user has allows the controller 34 to determine a device capability set that the given device can support. For example, some mobile wireless communications devices have enhanced processing, display, and memory capabilities and can therefore upload and view images, videos, attachments, etc., while older model devices may not support such features. Moreover, even if a given device can support certain features, these features may not be permitted under the subscriber's service plan with the carrier. Thus, the controller 34 may cooperate with the database 35 to determine and keep track of the respective device capability sets respectively associated with the mobile wireless communications devices 31a-31n based upon knowledge of the various device types and carrier systems that the email server 33 is operating with, as will be appreciated by those skilled in the art.

The controller 34 uses the PINs and unique IDs (e.g., IMEIs and/or IMSIs) to associate emails with respective mobile wireless communications devices 31a-31n. In particular, when a given device attempts to access the email server 33, it communicates a request to the server. Depending upon the type of interface used between the given device and the server 33, the request may already include the PIN and unique ID (e.g., IMEI) of the requesting device. For example, with a Wireless Markup Language (WML) interface, this information may be automatically embedded in the request. With other interfaces, such as a Hypertext Markup Language (HTML) interface, the server 33 may be required to prompt the given device for such information, as will be discussed further below.

As noted above, there are circumstances when the PIN/unique ID stored in a subscriber account do not match the PIN/unique ID provided by a given device. For example, if a user upgrades to a new device and switches his SIM card from an old device to the new one, the PIN/ID information provided by the device to the email sever 33 will not match the information stored in the subscriber's account (i.e., the given device ID (IMEI) provided by the device will not match the device ID in the account). As a result, the email server 33 may otherwise fail to complete an email request from the given device until the account information is reconciled/updated, which ordinarily would require the subscriber to call customer service, and a representative would manually update the account information.

Another circumstance in which the given PIN/ID provided by a given device may not match the information stored in the user account is when the carrier or email server 33 administrator updates the platform or software of the server. In particular, when the email server administrator rolls out new versions of the server platform, customer accounts may need to be migrated to the new platform. For a variety of reasons, it is possible that during the migration certain account information (IDs, settings, etc.) is not readily available or cannot be moved to the new accounts on the new platforms. In such case, the accounts may have nulls or placeholders for certain IDs, settings, etc., which do not match the actual PIN/IDs provided by the given device.

Accordingly, the controller 34 advantageously compares a given PIN and unique ID, based upon a communication from a given mobile wireless device 31, with a corresponding PIN and unique ID for the corresponding subscriber account in the database 35, and updates the corresponding subscriber account based upon a discrepancy. More particularly, the discrepancy may be a difference between the unique ID (e.g., IMEI and/or IMSI) associated with the communication from the given mobile wireless device 31 and the unique ID in the corresponding subscriber account. As noted above, the given PIN/ID may be included in the communication (i.e., request) from the given mobile wireless device 31, or the server 33 may prompt the given device for this information upon receiving a request (and the given device provides the information in a follow up communications). As such, the email server 33 may therefore automatically detect when account discrepancies occur and update the account accordingly with the need for subscriber and/or customer service intervention.

Figure 2:
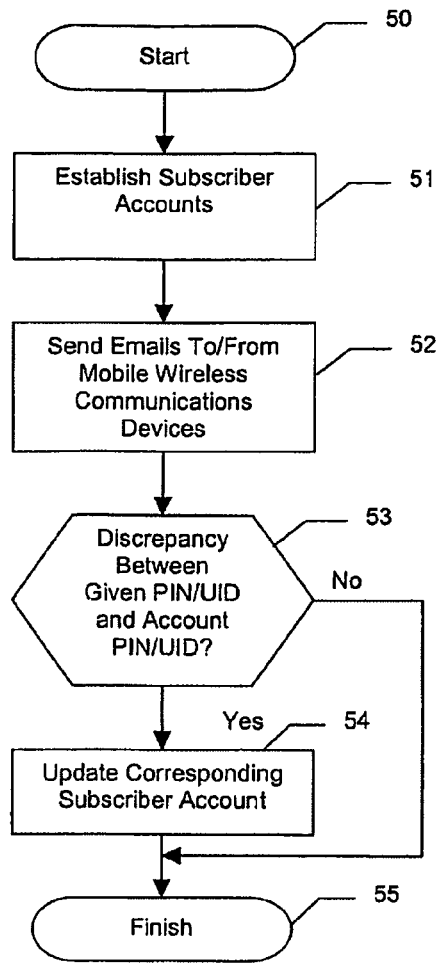
FIG. 2 and FIG. 3 are flow charts of wireless communications methods in accordance with the present invention.
Figure 3:
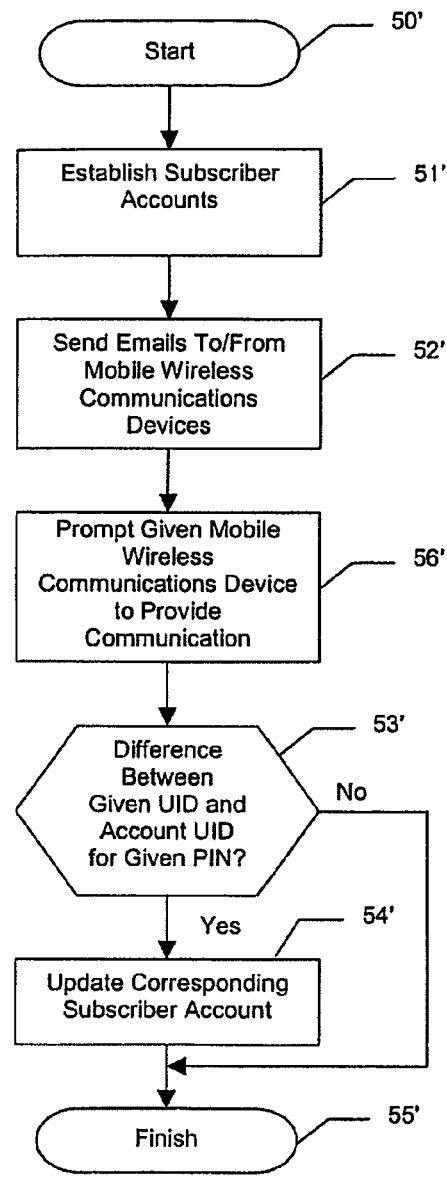

Turning now additionally to FIGS. 2 and 3, a wireless communications method aspect illustratively begins at Block 50 with establishing a respective subscriber account for a plurality of mobile wireless communications devices 31*a*-31*n*, at Block 51. As discussed further above, each subscriber accounting includes a respective PIN, unique ID(s), etc. Further, emails are sent to and received from the mobile wireless communications devices 31*a*-31*n* based upon the PINs and unique IDs, at Block 52. The method further includes comparing a given PIN and unique ID, based upon a communication from a given mobile wireless device, with a corresponding PIN and unique ID for the corresponding subscriber account, and updating the corresponding subscriber account based upon a discrepancy, at Blocks 53-54, as discussed above, thus concluding the illustrated method (Block 55).

As noted above, for some interfaces (e.g., HTML), it may be necessary for the email server 33 to prompt the given mobile wireless communications device 31 to provide the given PIN/unique ID via a follow up communication to the original request (Block 56'). More particularly, the discrepancy may be a difference between the unique ID (e.g., IMEI and/or IMSI) associated with the communication from the given mobile wireless device 31 and the unique ID in the corresponding subscriber account, at Block 53'.

Figure 4:
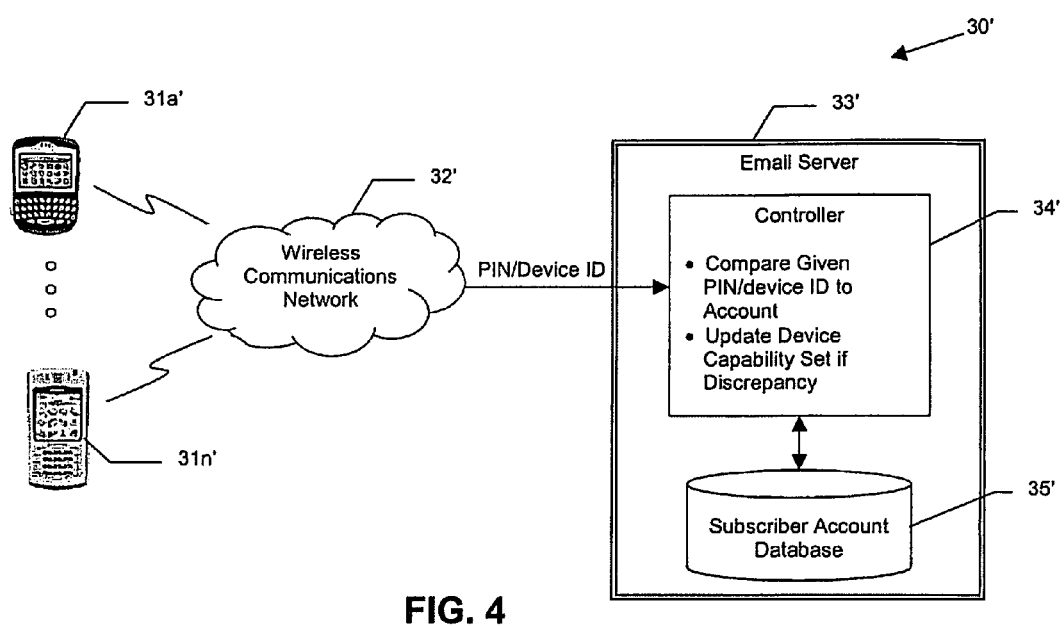
FIG. 4 is schematic block diagram of an alternate embodiment of a wireless communications system in accordance with the present invention.
Figure 5:
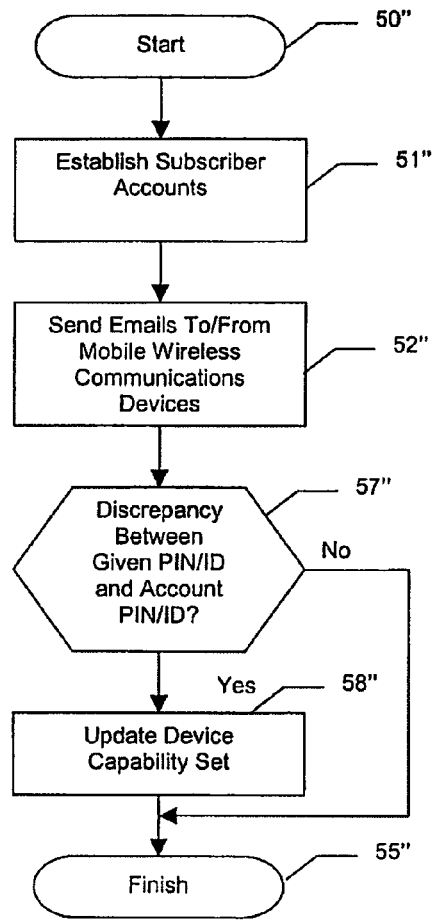
FIG. 5 and FIG. 6 are flow charts of alternative embodiments of wireless communications methods in accordance with the present invention.
Figure 6:
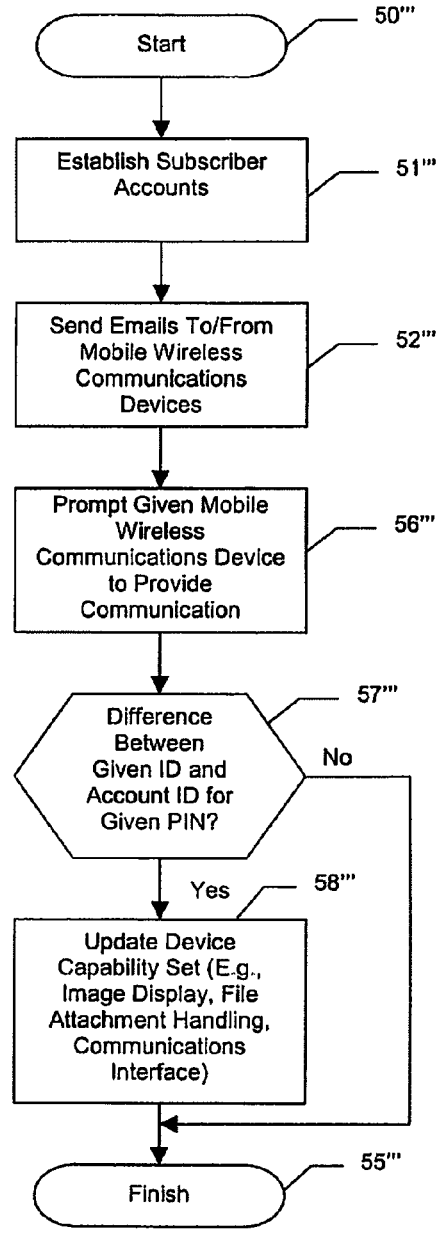

Referring now additionally to FIG. 4 through FIG. 6, the email server 33' may not only update the unique IDs (e.g., IMEI, IMSI) associated with a given account, it may also update the device characteristic set for the account. This could be done, for example, when it is detected that a subscriber is using a new device which has enhanced display, processing, memory, or communication capabilities. Of course, if a user switches to a device with lesser capabilities than a prior device, the device characteristic set may also be downgraded accordingly.

In particular, the email server 33' compares a given PIN and device ID (e.g., IMEI), based upon a communication from a given mobile wireless device, with a corresponding PIN and device ID for the corresponding subscriber account in the database, as discussed above, and updates a corresponding device capability set for the corresponding subscriber account based upon a discrepancy (Blocks 57"-58"). Again, the device capability set may include capabilities such as image display capabilities, file attachment handling capabilities, communications interface type/capability, etc. (Block 58''').

A set of scenarios centered around migration to an email system platform Blackberry Internet Service (BIS) from a prior platform Blackberry Web Client (BWC) will now be described. In the following scenarios, a subscriber/user is unable to associate his device PIN (e.g. IMEI), as recorded in an account maintained by a provisioning system PRV (which conceptually corresponds to the above-noted subscriber account database 33), with the BIS account that he is being logged into via a carrier ID (e.g., an IMSI) via an HTML or WML user interface.

Figure 7:
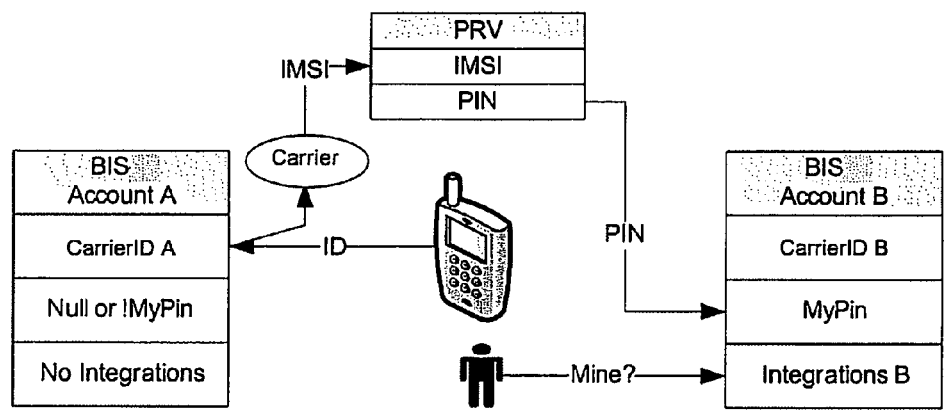
FIG. 7 is a schematic block diagram illustrating an unreconciled user service account.

Referring to FIG. 7, when the migration occurs an initial subscriber account A is created for the BIS system. However, for reasons which will be described further below, in some situations the data being populated in the new account may be incomplete, i.e., the PIN is not properly associated with a carrier subscriber ID (IMSI), etc. In these scenarios, the user's PIN may therefore be "held hostage" by the prior PRV account (i.e., BIS account A), which has a carrier ID A. In some scenarios the PRV account belongs to the user and may include integrations (i.e., user-defined preferences, available services, etc.) that the user wishes to retain.

The effects of the above-described discrepancies will depend upon the particular scenario. More particularly, in a scenario where the PIN cannot be set, the user may be unable to login. In any scenario where a "wrong" PIN is set, the user will be unable to control the email being sent to his device. Further, in a scenario where a PIN is being held hostage, the integrations in that account will continue to send email to the PIN, which might be acceptable if the other account (BIS account B) also belongs to the user, and the user is still interested is those integrated sources, but if not, then the result will likely require user/customer service intervention to correct.

Various logic and user interface (UI) changes may be made to the HTML and Wireless application protocol (WAP) proxies to help users self-service themselves in reclaiming their PINs and/or integrations. Some of these changes may be made in the carrier login code. This code will detect the scenarios where a user's PIN cannot be set because it is already associated with another account. In a case where PRV gives the "wrong" PIN and this is not detectable, then the problem may be addressed when the user uses a change handheld feature. Part of the reclaiming logic may require user input for the user to prove that the PIN belongs to him. Furthermore, there may also be integrations for which the user may need to provide "proof" of ownership.

The potential changes to the login process will now be discussed, including detection, UI flow, and resolution. FIG. 7 illustrates a general situation where a PIN is detected as being held hostage. When the user enters the HTML or WML site an ID, injected by the carrier gateway, is passed in. The ID can be used to lookup the account, or if the account does not exist can be used to create a new one. A PIN is associated with that account by correlating the ID to an IMSI via the carrier Application Program Interface (API), and then correlating the IMSI to a PIN via PRV. If the PIN is already associated with another account then a failure to set up the PIN will occur and the PIN hostage situation is detected.

Referring now to FIG. 8 through FIG. 18, these flow diagrams illustrate the seamless login and account creation logic, and how the various scenarios are dealt with. Table 1, below describes conventions used in the flowcharts.

TABLE 1

| | |
|---|---|
| Account | The account identified by the external ID/ Mobile Station International Integrated Services Digital Network (ISDN) Number (MSISDN) passed in the request header. |
| Hostage Account | The account that is associated with the PIN that has been determined to belong to another account. |

TABLE 1-continued

| | |
|---|---|
| PIN Free? | A Pin is determined to be free if it is NOT associated with any other account other than the desired account to be associated with. |
| Prompt | Describes required user input. |

Figure 8:
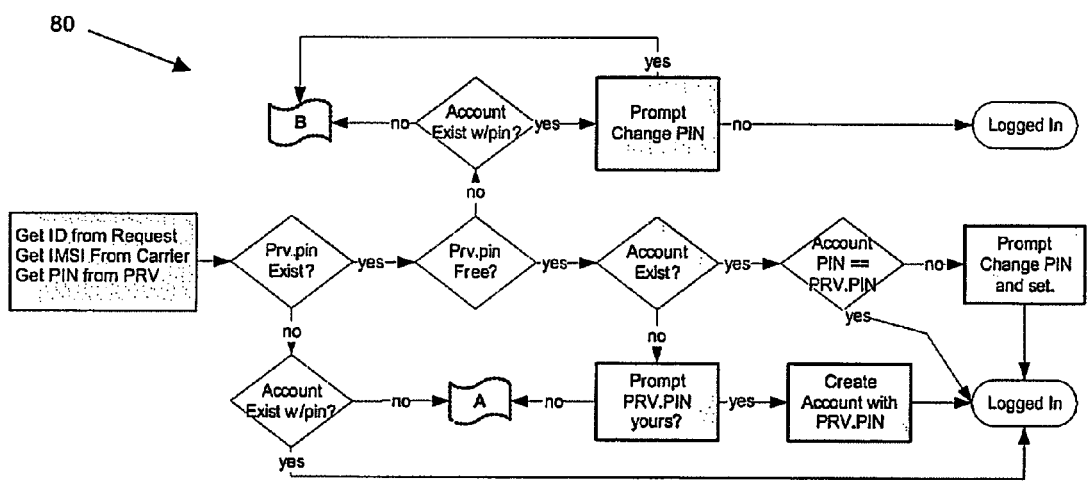
FIG. 8-FIG. 18 are flow diagrams illustrating logic paths for updating the user service accounts of FIG. 7.
Figure 9:
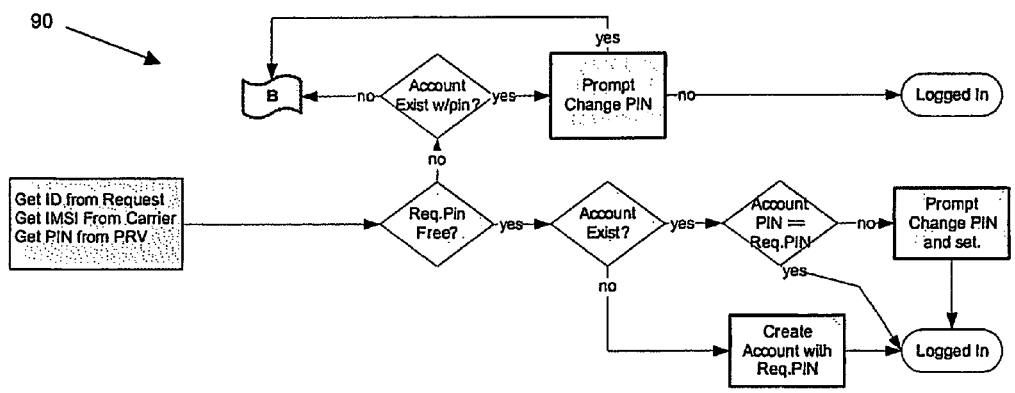

FIG. 8 and FIG. 9 illustrate typical login flows with one branch, B, detecting a hostage pin situation and another branch, A, detecting either a lack of a PRV PIN (PRV.PIN) or an invalid PRV.PIN. A typical login flow will resolve the correct PIN for the user, make sure it is free, create the account if it does not exist, and prompt the user if the PIN is changed. For the WML login case 90, the PIN is retrieved from the WML request, and for the HTML login case 80 it is retrieved from PRV. However, the PRV data may not always have the correct IMSI to PIN mapping for the user, so it is therefore desirable to prompt the user for confirmation.

In the case where the PRV.PIN does not exist but the account does exist with a PIN, it may be assumed that the current account PIN is correct and the user is logged in. The path B is entered when the retrieved PIN is not associated with the user's account and the user's account already has a PIN associated therewith. In such case, a decision is made as to whether the user desires to change pins.

Figure 10:
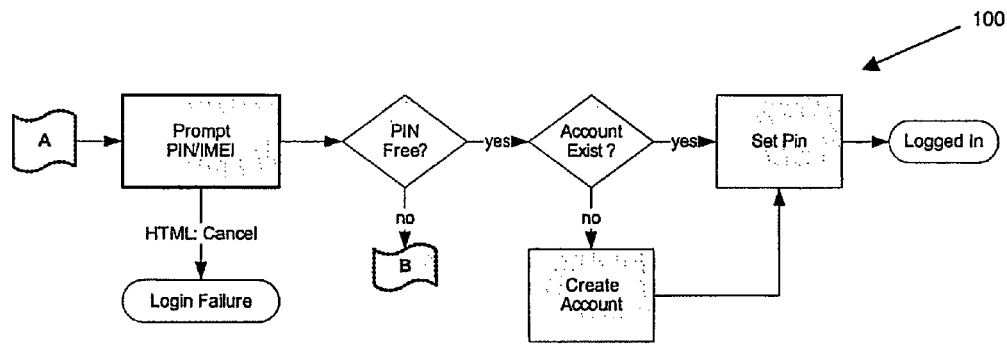

FIG. 10 illustrates the logic for when PRV has no associated PIN for the user/IMSI. This occurs in the HTML case. When this flow executes it is known that the PRV.PIN does not exist, and if the account exists it has no PIN. If the PIN entered is being held hostage, then the logic returns to path B. Otherwise, a new account is created if it does not exist and the PIN is set, at 100.

Figure 11:
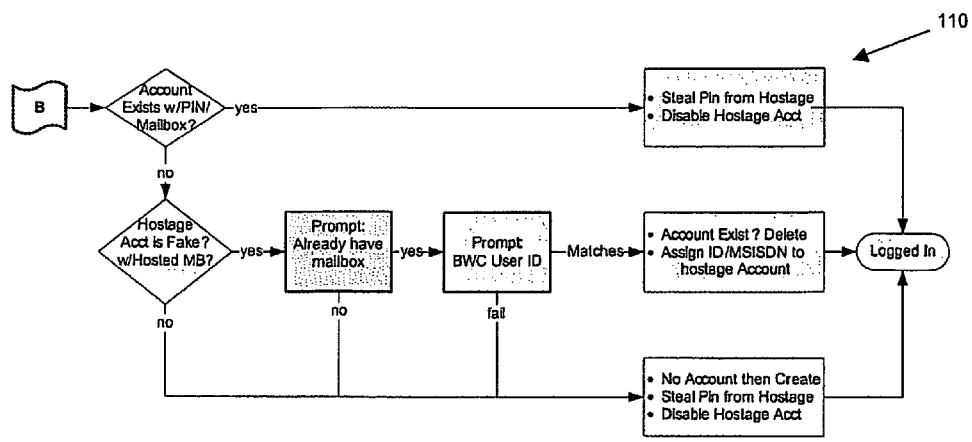
Figure 12:
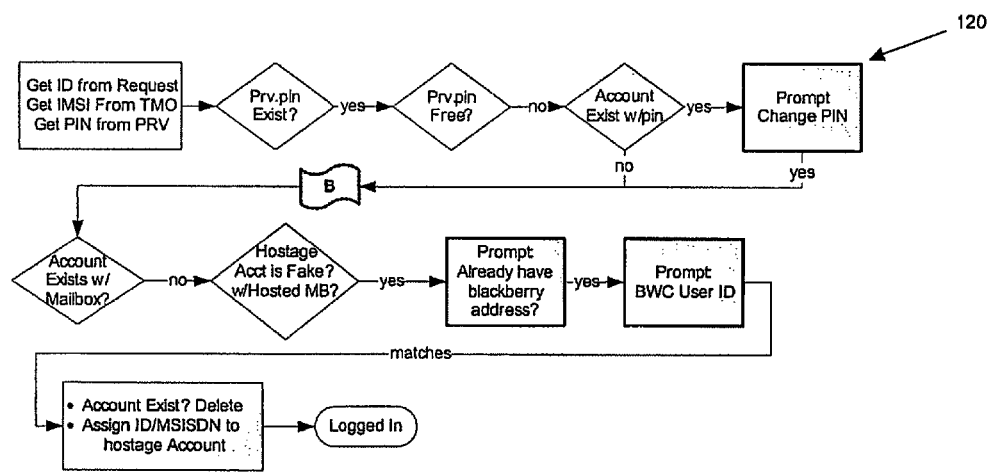

FIG. 11 illustrates the logic for when the PIN is determined, and it is determined that the PIN is being held hostage by another account, at 110. The PIN is determined either by looking it up in PRV, harvesting it from WML, or from a validated user input. If the user has an account with a PIN and mailbox, then the PIN is taken from the hostage account to avoid merging integrations from both accounts. The user is only able to reclaim the hostage account if this account has a fake ID, a hosted mailbox, and the user can enter the mailbox address of the account. If these conditions are met then the ID and MSISDN are copied to the hostage account. If another account has already been created for the user, then the other account is preferably deleted first.

If a user does not claim to have a mailbox or fails to prove ownership of it, then a new account may be created if it does not already exist. The PIN is taken from the hostage account, which is disabled. While prompting for the User ID, the UI may advantageously allow the user to go back and respond differently to having a mailbox already.

The logic flow for HTML for the scenarios noted above will now be described. The WML case only varies from the following scenarios in the way in which the PIN is retrieved, as noted above. In the first scenario (FIG. 12), the user's account is migrated to BIS with a fake ID. When the user logs in, PRV reports the correct PIN for the user, which of course is being held hostage by the fake account, along with his mailbox, at 120.

Figure 13:
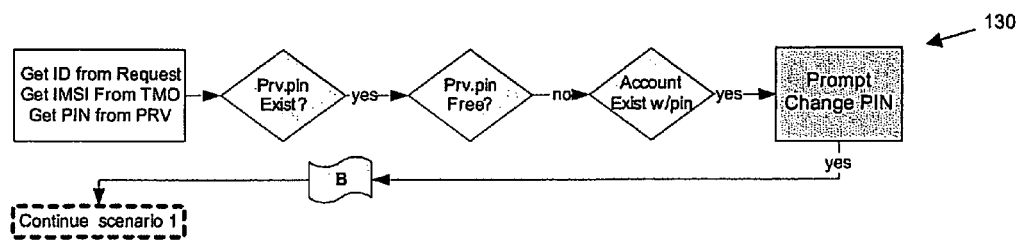
Figure 14:
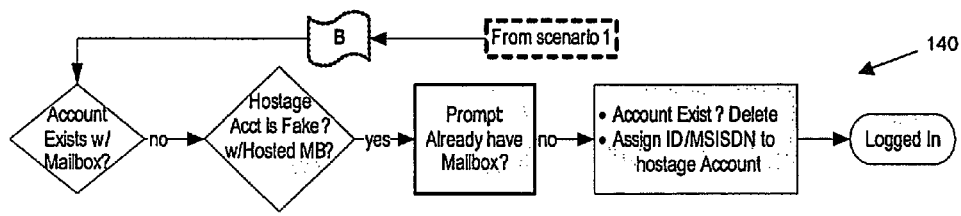

A second scenario, illustrated in FIG. 13, is essentially the same as scenario 1, except that the user's account has an old PIN. The logic flow therefore remains the same, except that the user is asked if he wishes to change the PIN, at 130. A third scenario is also similar to scenario 1, with the exception that the account holding the user's PIN does not include the user's integrations. As such, the user would either answer no to having a mailbox, or fail to enter the BWC UserID associated with the account, at 140.

Figure 15:
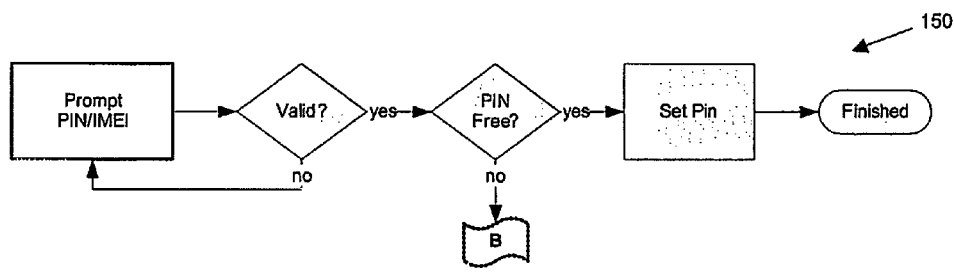

Referring to FIG. 15, for the WML case, it is possible that the user is using a different device than the one on record. It may be assumed that the device the user is currently using is the one specified in the WML request, and pre-populate the PIN/IMEI based thereon.

When a user enters the PIN/IMEI, the same hostage PIN detection logic applied during login may be applied, at 150. Of course, it is simplified in this case since it is known that the account exists and it has a PIN.

Figure 16:
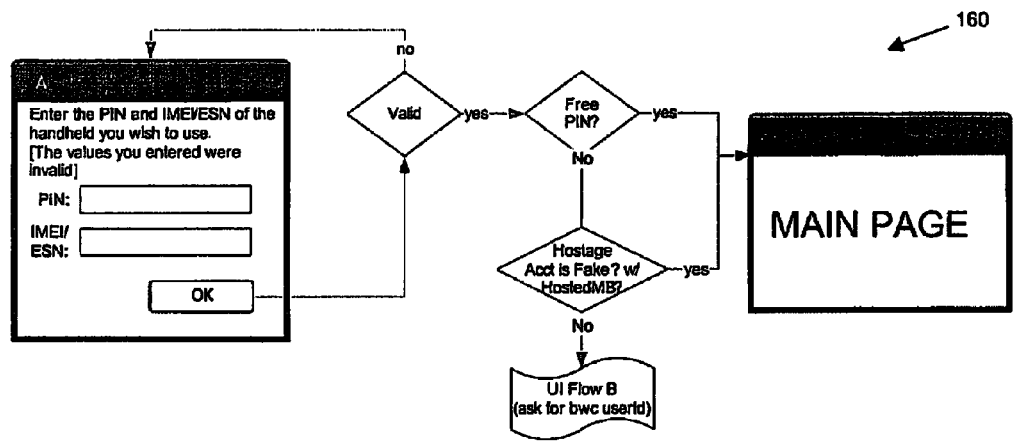
Figure 17:
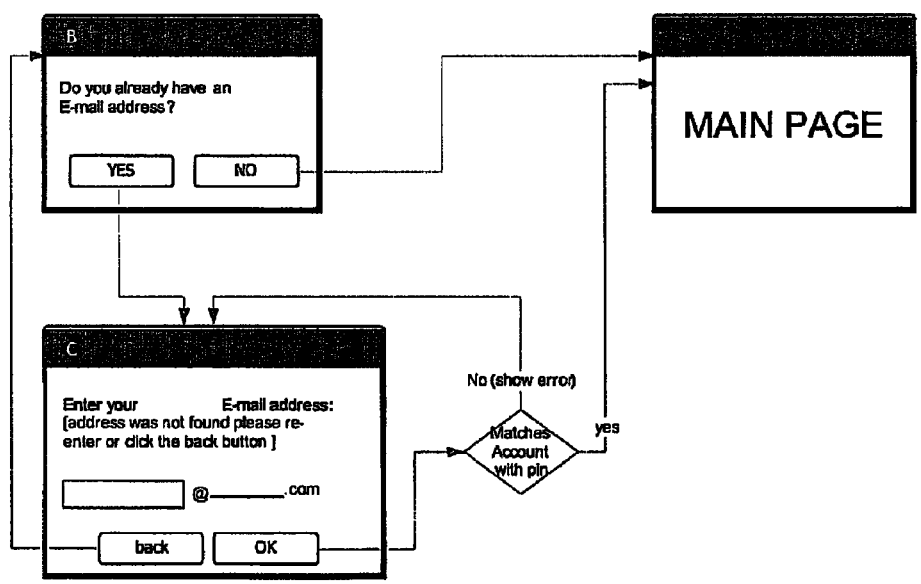
Figure 18:
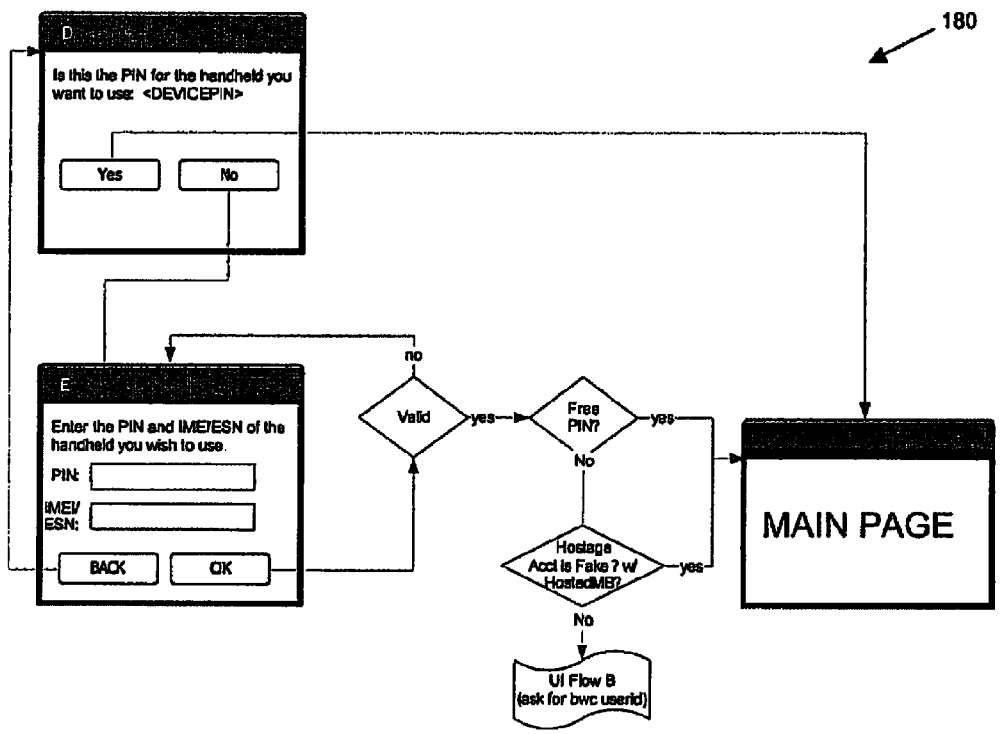

The UI is now described with reference to FIG. 16 through 18. For HTML, when both the PRV and the user's account have no PIN, then the user is asked for a PIN/IMEI. If the PIN/IMEI entered by the user is valid but is being held hostage by a faked account with a hosted mailbox, at 160, then the logic jumps to UI logic flow B (at 170). That is, UI logic flow B is entered when: (1) a PIN is proven to belong to a user; (2) the pin is being held hostage by a faked account; and (3) the user's current account (if it exists) has no mail sources.

A third UI logic flow C is entered when the PRV PIN is free and the user does not have an account with a PIN, at 180. The idea here is that PRV may not necessarily be trustworthy, and it will be verified with the user that this is his PIN. If it is not his PIN, then the user is prompted to enter a PIN, at which point the logic flow is similar to logic flow A. The logic flow for a new handheld would be the same as for UI logic flow A.

Some exemplary action handlers for implementing the above-noted logic flows are now provided. The following action handlers are written in Java script, and the first action handler (Action Handler 1) is for a seamless sign on scenario. It should be noted that in the following action handlers "context" refers to an object that contains a user's session state information (e.g., an account data). "Proxystate" is an object stored in the context which pertains to a transient workflow state. For example, this may include data that is used for a process such as a login or a configuration wizard.

Action Handler 1

```
Input: pin (will be != null in wml scenario)
Pseudocode:
If (isBdaEnabled) {
    If (pin == null) {
        Get imsi from [carrier];
        prvPin = Get pin from prv;
        if (prvPin == null) {
            try {
                Account acct = context.authenticate( );
                if (acct.pin == null) {
                    Forward to prompt pin/imei handler;
                }
                Else {
                    Forward to mailboxes screen (user is
                        logged in)
                }
            }
            Catch (authenticationexception) {
                Forward to prompt pin/imei handler;
            }
        }
        Proxystate.setPrvPin(prvPin);
        Proxystate.setDevicePin(prvPin);
    }
    Else {
        Pin = decrypt(pin);
        Proxystate.setPrvPin(null);
```

Action Handler 1

```
        Proxystate.setDevicePin(pin);
    }
    Forward to pincheckhandler( );
}
```

Instead of going to PRV to get the PIN, in some scenarios the PIN is simply retrieved from the proxy state because it will have been set previously by the login handler.

A second action handler (Action Handler 2) validates the PIN/IMEI entered by the user.

Action Handler 2

```
Input: pin, imei
Pseudocode:
If (pin == null || imei == null) {
    Show pin/imie screen;
}
Else {
    If (pin/imei are valid) {
        Forward to PinCheckHandler;
    }
    Else {
        Show pin/imei screen w/ error msg;
    }
}
```

A third action handler (Action Handler 3) code checks if the user's PIN has been taken hostage by another account, or if the user's PIN needs to be changed.

Action Handler 3

```
Input: none
Pseudocode:
pin = proxystate.getDevicePin( );
prvPin = proxystate.getPrvPin( );
If (pin is free?) {
    If (pin == prvPin) { // html scenario
        Try {
            Account acct = context.authenticate( );
            If (acct.pin == null) {
                Forward to prvpinhandler;
            }
            Else if (acct.pin == pin) {
                Forward to mailboxes screen (user is logged
                in)
            }
            Else {
                Show change pin prompt;
            }
        }
        Catch (AuthenticationException) {
            Forward to prvpinhandler;
        }
    }
    Else {
        Try {
            Account acct = context.authenticate( );
            If (acct.pin != pin) {
                Acct.pin = pin;
                Forward to mailboxes screen (user is logged
in)
            }
            Else {
                Show change pin prompt;
            }
```

Action Handler 3

```
        }
        Catch (AuthenticationException) {
            Forward to CarrierAcctHandler;
        }
    }
}
Else {
    Try {
        Account acct = context.authenticate( );
        If (acct.pin == null) {
            Forward to hostage acct handler;
        }
        Else {
            Forward to change pin handler;
        }
    }
    Catch (authenticationException) {
        Forward to hostage acct handler;
    }
}
```

A fourth action handler (Action Handler 4) code is used in both the HTML and WML scenarios.

Action Handler 4

```
Input: none
Pseudocode:
If (context.isAuthenticate( ) && acct has mailbox(es)) {
    Steal pin from hostage;
    Disable hostage acct;
    forward to mainmenu mailboxes (user is logged in)
}
Else {
    If (hostage acct is fake && has hosted mailbox) {
        Forward to reclaimhostageaccthandler;
    }
    Else {
        If (acct does not exist) {
            Create acct;
        }
        Steal pin from hostage acct;
        Disable hostage acct;
        Context.authenticate( );
        Forward to mainmenu mailboxes (user is logged in)
    }
}
```

A fifth action handler (Action Handler 5) code is a continuation of the hostage account handler logic, prompting the user for information proving they can reclaim the hostage account.

Action Handler 5

```
Input: prompt, bwcUserId
Pseudocode:
If (bwcUserId is null) {
    If (prompt is null) {
        Show prompt screen;
    }
    Else {
        If (prompt is yes) {
            Show prompt for BWC User ID screen;
        }
        Else {
            If (acct does not exist) {
                Create acct;
            }
            Steal pin from hostage acct;
```

-continued

```
Action Handler 5

Disable hostage acct;
        Context.authenticate( );
        Forward to mainmenu mailboxes screen (user is
           logged in);
        }
    }
}
Else {
    If (bwcUserId matches hosted mailbox) {
        If (acct exists) {
            deleteMailboxAccount( );
        }
        Assign externalId and MSISDN to hostage acct;
        Context.authenticate( );
        Forward to mainmenu (user becomes logged in);
    }
    Else {
        Show prompt for bwcUserId screen (w/ err msg);
    }
}
```

A sixth action handler (Action Handler 6) handles the situation where an account needs to be created or updated with a PIN provided by PRV. This is used only in the HTML scenario. It is used for new account creation in the HTML scenario.

```
Action Handler 6

Input: prompt
Pseudocode:
If (prompt == null) {
    Show verify_PIN screen;
}
Else {
    If (prompt is yes) {
        If (context.isAuthenticated) {
            Acct.pin = pin;
        }
        Else {
            Forward to CarrierAccountHandler;
        }
    }
    Else {
        Show pin_imei_validate screen;
    }
}
```

Figure 19:
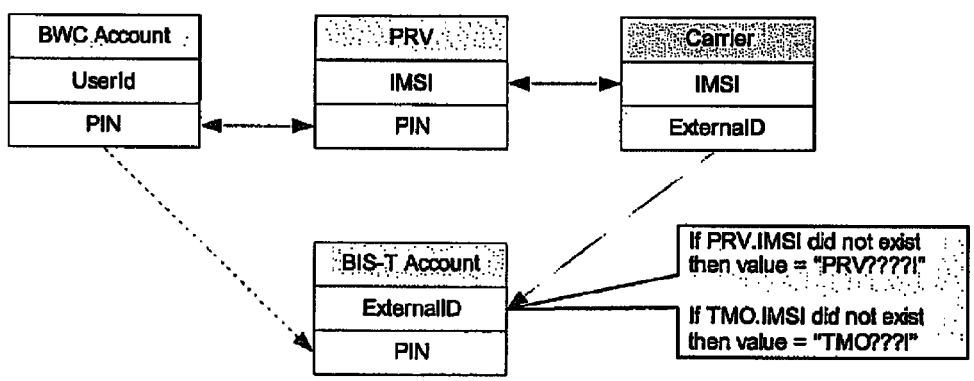
FIG. 19 is another schematic block diagram illustrating unreconciled user service accounts.

Another potential issue involved in the above noted email service platform migration is that there may be some accounts to which the external ID cannot be resolved. To correlate the account to an external ID, the PIN of the BWC account may be used to find the IMSI in PRV. The IMSI may then be used to find the External ID from the carrier, as shown in FIG. 19.

In one use case, when the ExternalID could not be correlated, a temporary or fake ID was generated. In particular, two types of fake IDs were generated. If the PIN had no IMSI in PRV, then an ID was generated with a pattern "PRV9999!". Otherwise, if the carrier IMSI did not exist then an ID was generated with the pattern "[Carrier]9999!". The reason this was done was to ensure there was at least a temporary account in BIS so that the user would continue to get his email delivered to his device.

A new BIS account is created for a user without a PIN (FIG. 21), because his PIN is associated with another prior account which has faked IDs (FIG. 20). However, the result of this condition prevents the user from logging in and being able to manage his integrated sources, as the integrations are still associated with the prior account.

Accordingly, during a first use case scenario there was no IMSI in PRV related to a BWC account PIN, so the account was created with a fake ID. At some point later the BWC account PIN in PRV was re-associated with an IMSI, perhaps because of a device registration. Next a user logged in with an ExternalID not related to any account in BIS, and the account creation logic was invoked. The IMSI was looked up from the carrier via the ExternalID. The IMSI was then used to lookup the PIN in PRV. The account was then created, but the PIN could not be set because it belonged to the faked account.

One potential approach for addressing this scenario is that when the user enters the system and this scenario is detected, then the user is "authenticated". If authentication is successful the account is updated with the proper ExternalID and MSISDN, for example. Authenticating the user will include validating the PIN/IMEI of the device and then prompting the user for their BWC user ID. As noted above, in the WML case the PIN/IMEI can be harvested from the request. However, for HTML the user may need to be prompted to enter his IMEI. Once the account has been re-possessed, the prior PIN-less account, if it exists, can be deleted.

A second use case scenario is when a new BIS account is created for a user with an old PIN. The user's current PIN is associated with another account which has a faked ID and the user's integrations. One potential approach for addressing this scenario is the same as for the first use case scenario described above, with the addition that PRV is updated with the new PIN so that the user is not prompted as to whether they would like to change to the old PIN each time he accesses the system.

A third use case scenario is when a new BIS account is created for a user without a PIN, because his PIN is associated with another account which has a faked ID. Additionally, the faked account with its PIN has another user's integrations. Here again, the same approach may be used in this use case scenario as for the first use case scenario noted above. If a user is unable to identify the integrations (i.e., via a BWC user id), then the user may only own the PIN and not the account. In such case, the PIN may simply be moved from the fake account to the new account.

One example of a hand-held mobile wireless communications device 1000 that may be used in accordance the system 20 is further described in the example below with reference to FIG. 22. The device 1000 illustratively includes a housing 1200, a keypad 1400 and an output device 1600. The output device shown is a display 1600, which is preferably a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400 by the user.

The housing 1200 may be elongated vertically, or may take on other sizes and shapes (including clamshell housing structures). The keypad may include a mode selection key, or other hardware or software for switching between text entry and telephony entry.

Figure 22:
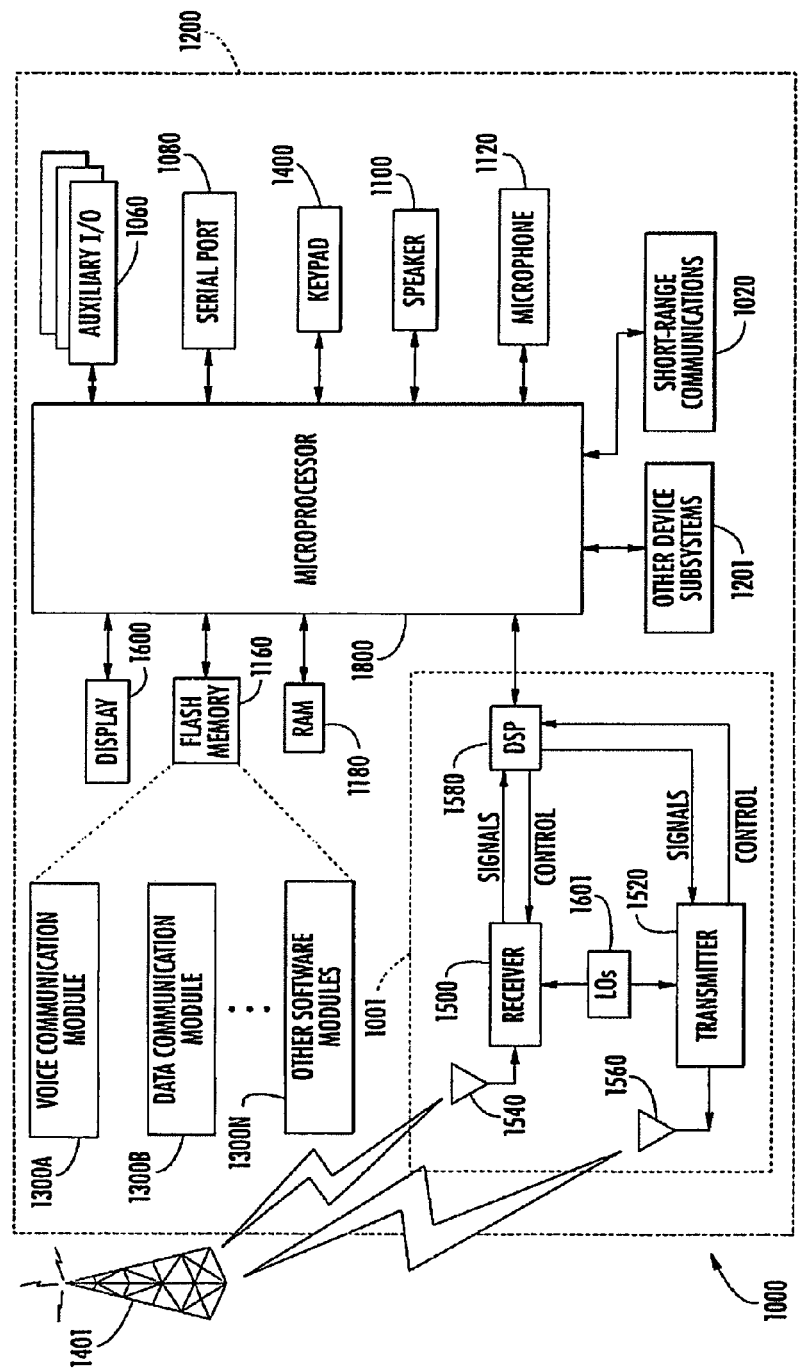
FIG. 22 is a schematic block diagram illustrating exemplary components of a mobile wireless communications device for use with the present invention.

In addition to the processing device 1800, other parts of the mobile device 1000 are shown schematically in FIG. 22. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 is preferably a two-way Radio Frequency (RF) communications device having voice and data communications capabilities. In addition, the mobile device 1000 preferably has the capability to communicate with other computer systems via the Internet.

Operating system software executed by the processing device 1800 is preferably stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 1401. Preferably, the PIM data items are seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as Advanced Mobile Phone Service (AMPS), Time Division Multiple Access (TMDA), Code Division Multiple Access (CDMA), Personal Communications Services (PCS), Global System for Mobile Communications (GSM), etc. Other types of data and voice networks, both separate and integrated, may also be utilized with the mobile device 1000.

Network access requirements vary depending upon the type of communication system. For example, in the Mobitex™ and DataTAC™ networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A wireless communications system comprising:
   a plurality of mobile wireless communications devices each having a subscriber account associated therewith including a respective personal identification number (PIN) and a device identification (ID), each device ID having associated therewith a device capability set from among a plurality of device capability sets; and
   at least one electronic mail (email) server comprising a database of subscriber accounts and configured to send emails to and receive emails from said mobile wireless communications devices based upon the PINs and device IDs;

said at least one email server compare a given PIN and device ID, based upon a communication from a given mobile wireless communications device, with a corresponding PIN and device ID for the corresponding subscriber account in said database, and update a corresponding device capability set for the corresponding subscriber account based upon a discrepancy;

said at least one email server also configured to determine if the PIN in the subscriber account for said given mobile wireless communications device corresponds to the device ID in the subscriber account and, if not, reconcile the subscriber account to include a corresponding PIN for the device ID.

2. The wireless communications system of claim 1 wherein the device capability sets comprise at least one of an image display capability, a file attachment handling capability, and a communications interface capability.

3. The wireless communications system of claim 1 wherein the discrepancy comprises a difference between the device ID associated with the communication from said given mobile wireless device and the device ID in the corresponding subscriber account.

4. The wireless communications system of claim 1 wherein said at least one email server is configured to prompt said given mobile wireless communications device to provide the communication.

5. The wireless communications system of claim 1 wherein the device IDs comprise International Mobile Station Equipment Identities (IMEIs).

6. The wireless communications system of claim 1 wherein said at least one email server interfaces with said given wireless communications device via a Hypertext Markup Language (HTML) interface.

7. The wireless communications system of claim 1 wherein said at least one email server interfaces with said given wireless communications device via a Wireless Markup Language (WML) interface.

8. The wireless communications system of claim 1 further comprising at least one wireless communications network for establishing wireless communications links with said mobile wireless communications devices; and wherein said at least one email server sends emails to and receives emails from said mobile wireless communications devices via said at least one wireless communications network.

9. An email server configured to send emails to and receive emails from a plurality of mobile wireless communications devices, each having a subscriber account associated therewith including a respective personal identification number (PIN) and a device identification (ID), based upon the PINs and device IDs, each device ID having associated therewith a device capability set from among a plurality of device capability sets, the email server comprising:

a database of subscriber accounts; and a controller cooperating with said database and configured to compare a given PIN and device ID, based upon a communication from a given mobile wireless communications device, with a corresponding PIN and device ID for the corresponding subscriber account in said database, and update a corresponding device capability set for the corresponding subscriber account based upon a discrepancy;

said controller also cooperating with said database and configured to determine if the PIN in the subscriber account for the given mobile wireless communications device corresponds to the device ID in the subscriber account and, if not, reconcile the subscriber account to include a corresponding PIN for the device ID.

10. The email server of claim 9 wherein the device capability sets comprise at least one of an image display capability, a file attachment handling capability, and a communications interface capability.

11. The email server of claim 9 wherein the discrepancy comprises a difference between the device ID associated with the communication from the given mobile wireless device and the device ID in the corresponding subscriber account.

12. The email server of claim 9 wherein said controller is configured to prompt the given mobile wireless communications device to provide the communication.

13. The email server of claim 9 wherein the device IDs comprise International Mobile Station Equipment Identities (IMEIs).

14. The email server of claim 9 wherein said controller interfaces with the given wireless communications device via a Hypertext Markup Language (HTML) interface.

15. The email server of claim 9 wherein said controller interfaces with the given wireless communications device via a Wireless Markup Language (WML) interface.

16. A wireless communications method comprising:

establishing respective subscriber accounts for a plurality of mobile wireless communications devices, each subscriber account including a respective personal identification number (PIN) and a device identification (ID), and each device ID having associated therewith a device capability set from among a plurality of device capability sets;

sending emails to and receiving emails from the mobile wireless communications devices based upon the PINs and device IDs;

comparing a given PIN and device ID, based upon a communication from a given mobile wireless communications device, with a corresponding PIN and device ID for the corresponding subscriber account, and updating a corresponding device capability set for the corresponding subscriber account based upon a discrepancy; and determining if the PIN in the subscriber account for the given mobile wireless communications device corresponds to the device ID in the subscriber account and, if not, reconciling the subscriber account to include a corresponding PIN for the device ID.

17. The method of claim 16 wherein the device capability sets comprise at least one of an image display capability, a file attachment handling capability, and a communications interface capability.

18. The method of claim 16 wherein the discrepancy comprises a difference between the device ID associated with the communication from the given mobile wireless device and the device ID in the corresponding subscriber account.

19. The method of claim 16 wherein the device IDs comprise International Mobile Station Equipment Identities (IMEIs).

20. The method of claim 16 further comprising establishing wireless communications links with the mobile wireless communications devices; and wherein sending emails to and receiving emails from the mobile wireless communications devices comprises sending emails to and receiving emails from the mobile wireless communications devices via the wireless communications links.

* * * * *

UNITED STATES PATENT AND TRADEMARK OFFICE
CERTIFICATE OF CORRECTION

| | |
|---|---|
| PATENT NO. | : 7,787,864 B2 |
| APPLICATION NO. | : 11/389906 |
| DATED | : August 31, 2010 |
| INVENTOR(S) | : Provo |

Page 1 of 1

It is certified that error appears in the above-identified patent and that said Letters Patent is hereby corrected as shown below:

| | |
|---|---|
| Cover page – Other Publications | Insert: -- I-DEC – the IMEI Detection System for Consistent MMS Quality, Polystar, http://www.polystar.se/upload.polystar_Instruments/Partner/Polystar/Datasheets/iDec_Marketingfolder-1.0 pdf. -- |
| Column 15, Line 4 | Delete: "compare" Insert: -- compares -- |

Signed and Sealed this
Twenty-eighth Day of June, 2011

David J. Kappos
*Director of the United States Patent and Trademark Office*